US009384294B2

(12) United States Patent
Shin

(10) Patent No.: US 9,384,294 B2
(45) Date of Patent: Jul. 5, 2016

(54) MULTIMEDIA SHARING APPARATUS USING COPY OF METADATA DATABASE OF PORTABLE TERMINAL AND METHOD THEREOF

(71) Applicant: Samsung Electronics Co., Ltd., Gyeonggi-do (KR)

(72) Inventor: Ho-Chul Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/649,991

(22) Filed: Oct. 11, 2012

(65) Prior Publication Data

US 2013/0091169 A1    Apr. 11, 2013

(30) Foreign Application Priority Data

Oct. 11, 2011 (KR) .......................... 10-2011-0103413

(51) Int. Cl.
*G06F 17/30* (2006.01)
(52) U.S. Cl.
CPC .... *G06F 17/30893* (2013.01); *G06F 17/30038* (2013.01); *G06F 17/30902* (2013.01)
(58) Field of Classification Search
CPC ................. G06F 17/30902; G06F 17/30893; G06F 17/30038
USPC ............. 707/781, 709, 782, 999.107, 999.01, 707/975, 913, 916, E17.032; 709/219, 229
See application file for complete search history.

(56) References Cited

U.S. PATENT DOCUMENTS

| 7,904,423 | B2* | 3/2011 | Vermeulen et al. ............ 707/626 |
| 2003/0126072 | A1* | 7/2003 | Brock ................... G06Q 10/087 705/38 |
| 2005/0125419 | A1* | 6/2005 | Mizutani ........... G06F 17/30899 707/E17.119 |
| 2008/0066100 | A1* | 3/2008 | Brodersen ......... G06F 17/30855 725/35 |
| 2009/0013269 | A1* | 1/2009 | Khandpur ............. G06F 3/0481 715/764 |
| 2009/0063649 | A1* | 3/2009 | Yamagishi ......... H04N 21/4722 709/207 |
| 2009/0216788 | A1* | 8/2009 | Rao .................... G06F 17/30233 707/E17.044 |
| 2009/0282060 | A1* | 11/2009 | Paulussen ........... G06F 17/3002 707/E17.005 |
| 2010/0220769 | A1* | 9/2010 | Sato ................. H04N 21/43615 375/211 |
| 2010/0268765 | A1* | 10/2010 | Honjo ................ H04N 21/4344 709/203 |
| 2011/0138316 | A1* | 6/2011 | Park ........................ G06F 3/048 715/780 |
| 2012/0110015 | A1* | 5/2012 | Nath et al. .................... 707/780 |

* cited by examiner

*Primary Examiner* — Phong Nguyen

(57) ABSTRACT

A multimedia sharing apparatus uses a copy of a metadata database of a portable terminal for copying the metadata database stored in a server. The multimedia sharing apparatus stores the copied metadata database in the portable terminal, and reduces an overhead using the stored metadata database when a user searches data. A multimedia sharing method includes requesting a server to transmit a metadata database at a portable terminal, receiving access information capable of accessing the metadata database of the server at the portable terminal from the server, and reading the metadata database of the server at the portable terminal using the access information.

13 Claims, 4 Drawing Sheets

MULTIMEDIA SHARING APPARATUS USING COPY OF METADATA DATABASE OF PORTABLE TERMINAL AND METHOD THEREOF

CROSS-REFERENCE TO RELATED APPLICATION(S) AND CLAIM OF PRIORITY

The present application is related to and claims the benefit under 35 U.S.C. §119(a) to a Korean Patent Application filed in the Korean Intellectual Property Office on Oct. 11, 2011 and assigned Serial No. 10-2011-0103413, the entire disclosure of which are hereby incorporated by reference.

TECHNICAL FIELD OF THE INVENTION

The present disclosure relates to a multimedia sharing apparatus using a copy of a metadata database of a portable terminal and a method thereof. More particularly, the present disclosure relates to a multimedia sharing apparatus using a copy of a metadata database of a portable terminal for copying the metadata database stored in a server, storing the copied metadata database in the portable terminal, and reducing an overhead using the stored metadata database when a user searches data and a method thereof.

BACKGROUND OF THE INVENTION

As a multimedia system is developed, a user of the multimedia system may share multimedia in or out of the home. A home network service provided in the home makes great advances after a public consultative group for performing commercialization of a home network, called Digital Living Network Alliance (DLNA) is started. Accordingly, the user may share contents between different brands and products, through a wired or wireless home network, among home appliances, PCs, and wireless devices. Also, multimedia sharing may be performed through a separate external server connected with a home network when providing contents to an external device.

With advances in multimedia systems, efficient management of various contents which are separately stored in several devices has come to the fore as an important issue. The user may typically use metadata information to search a device which stores contents that the user wants to download and systematically store.

However, when the user uses metadata information stored in a server, there are problems in that it takes a long time to perform an initial setup, an overhead is generated to read the metadata information of the server, and a protocol suitable for a terminal of the user and the server must be defined.

SUMMARY OF THE INVENTION

To address the above-discussed deficiencies of the prior art, it is a primary object to provide at least the advantages described below. Accordingly, an aspect of the present disclosure is to provide a multimedia sharing apparatus capable of using a copy of a metadata database of a portable terminal for copying the metadata database stored in a server. The multimedia sharing apparatus stores the copied metadata database in the portable terminal, and reduces an overhead using the stored metadata database when a user searches data and a method thereof.

Another aspect of the present disclosure is to provide a multimedia sharing apparatus capable of using a copy of a metadata database of a portable terminal for allowing the portable terminal to receive the metadata database stored in a server more simply and quickly than a protocol obtaining conventional metadata information using, the same File Transfer Protocol (FTP) as that of the server.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on the user's or operator's intention and usage. That is, the terms used herein are to be understood based on the descriptions made herein.

Figure 1:
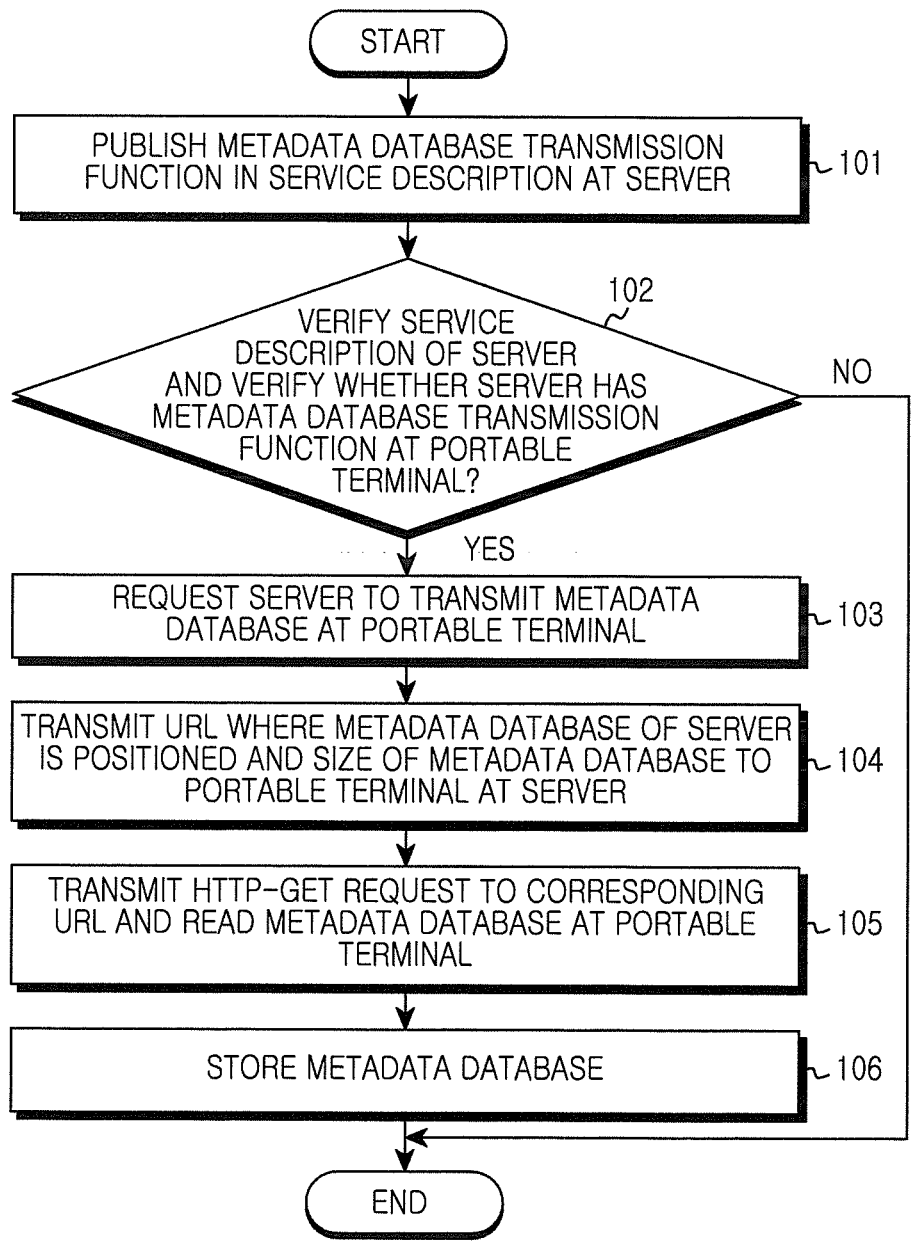
FIG. 1 is a flowchart illustrating a multimedia sharing method using a copy of a metadata database of a portable terminal according to one embodiment of the present disclosure.

FIG. 1 is a flowchart illustrating a multimedia sharing method using a copy of a metadata database of a portable terminal according to one embodiment of the present disclosure.

As shown in FIG. 1, a server publishes a metadata database transmission function in a service description (block 101). Metadata also means attribute information. The metadata is data provided for contents according to a certain rule to efficiently search and use information to be searched from a large quantity of information. Herein, a position and details of contents, information about a writer, rights conditions, use conditions, a use history, and the like, are recorded in the metadata. In a computer, the metadata is generally used for the purpose of expressing data and quickly searching data. A well-known example of metadata used for the purpose of expressing data is a HyperText Markup Language (HTML) tag. In data structuring, a head or a body is included in the HTML tag. A table may be included in the body. 'Tr' may be included in the table and 'td' may be included in the 'tr'. Data structuring means that data is configured as a structure of a tree type from an upper part to a lower part. Another purpose of the metadata is for quickly searching data. The metadata serves as an index of information in the computer. Because the metadata may be very well configured in a database frequently used by users, the users may quickly search data. A user may easily search specific data (information) that the user wants to receive using metadata through a search engine, etc. Functions of the metadata are for extracting data of an actor or an actress in one scene of a movie, or displaying only a goal scene on a video of a football game and editing the video data.

A metadata database transmission function refers to a server having a function for transmitting a metadata database itself stored in the server to the portable terminal. In a conventional system, a portable terminal separately receives a metadata database stored in a server. Accordingly, there are problems in that significant overhead is generated in the portable terminal and it takes a long time to perform an initial setup. However, the present disclosure provides a function for transmitting the metadata database itself stored in the server to the portable terminal. The server publishes that it includes the above-described metadata database transmission function to inform the published information to the user who wants to receive the metadata database itself. In one embodiment, a service for publishing the metadata database transmission function is a Content Directory Service (CDS). One embodiment for specifying the metadata database transmission function is as follows.

```
<actionList>
<action>
<name>ExportDatabase</name>
<argumentList>
    <argument>
    <name>ExportURL</name>
    <direction>out</direction>
    </argument>
    <argument>
    <name>Size</name>
    <direction>out</direction>
    </argument>
<argumentList>
</action>
</actionList>
```

Herein, <name>ExportURL</name> denotes a position of the metadata database and <name>Size</name> denotes a size of the metadata database. Accordingly, the user may know that the server includes the metadata database transmission function through <name>ExportDatabase</name> and may know a size of a Uniform Resource Locator (URL) of the corresponding metadata database.

The user who wants to receive the metadata database of the server verifies whether the above-described server includes the metadata database transmission function (block 102). The portable terminal determines whether the server includes the metadata database transmission function. If it is determined that the server includes the metadata database transmission function, the portable terminal requests the server to transmit the metadata database stored in the server (block 103). The process of block 103 includes a process of acquiring a URL of a place where the metadata database of the server is stored at the portable terminal. In that, the portable terminal knows the place where the metadata database is stored in the server and may access the metadata database. Access information used for accessing the metadata database of the server includes a URL of the server and a size of the metadata database.

One embodiment of a command for requesting the server to transmit the metadata database stored in the server at the portable terminal is as follows.

```
<?xml version="1.0"?>
<s:Envelope
xmlns:s="http://schemas.xmlsoap.org/soap/envelope/"
s:encodingStyle="http://schemas.xmlsoap.org/soap/envelope/" >
<s:Body>
<u:ExportDatabas
xmlns:u="urn:schemas-upnp-org:service:ContentDirectoryService:1">
</u:ExportDatabas>
<s:Body>
</s:Envelope>
```

If the metadata database is requested from the portable terminal, the server transmits the URL where the metadata database of the server is positioned and the size of the metadata database to the portable terminal (block 104). One embodiment of a message for transmitting the corresponding URL and size to the portable terminal at the server is as follows.

```
<?xml version="1.0" encoding=UTF-8"?>
<DIDL-Lite
xmls:dc="http://purl.org/dc/elements/1.1/"
xmls:dc="urn:/schemas-upnp-org:metadata-1-0/DIDL-Lite/"
xmls:upnp="urn:/schemas-upnp-org:metadata-1-0/upnp/"
xmls:xsi="http:/www.w3.org/2001/XMLSchema-instance/"
xsi:schemaLocation="
urn:schemas-upnp-org:metadata-1-0/DIDL-Lite/
http://www.upnp.org/schemas/av/upnplite.xsd
urn:schemas-upnp-org:metadata-1-0/upnp/
http://www.upnp.org/schemas/av/upnp.xsd">
<ExportURL>http://192.168.0.1:8080/XXXX</ExportURL>
<Size>4561234<<Size>
</DIDL-Lite>
```

Herein, URL information of the metadata database stored in the server may be known through <ExportURL>http://192.168.0.1:8080/XXXX</ExportURL>.

If the URL where the metadata database is positioned and the size of the metadata database are received from the server, the portable terminal transmits a MAP-GET request to the received URL and reads the metadata database (block 105). In one embodiment, the portable terminal uses another protocol such as a FTP.

One embodiment of a message for transmitting, the HTTP-GET request to the URL received from the server at the portable terminal is as follows.

XXXX HTTP/1.0
HOST: 192.168.0.1:8080
CONTENT-LENGTH:4561234

If the portable terminal stores the read metadata database (block 106), the multimedia sharing method using the copy of the metadata database is completed.

If it is determined that the server does not include the metadata database transmission function in block 102, the multimedia sharing method using the copy of the metadata database is completed.

Figure 2:
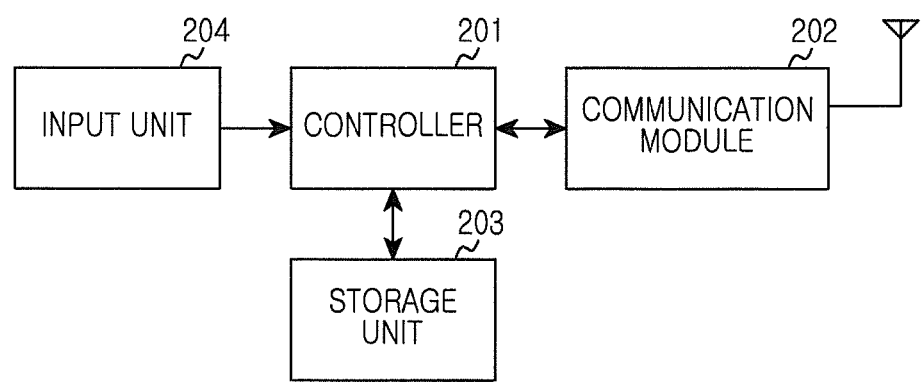
FIG. 2 is a block diagram illustrating a configuration of a portable terminal in a multimedia sharing apparatus using a copy of a metadata database of the portable terminal according to one embodiment of the present disclosure.

FIG. 2 is a block diagram illustrating a configuration of a portable terminal in a multimedia sharing apparatus using a copy of a metadata database of the portable terminal according to one embodiment of the present disclosure.

As shown in FIG. 2, the portable terminal in the multimedia sharing apparatus may include a controller 201, a communication module 202, a storage unit 203, and an input unit 204.

The controller 201 controls an overall operation of the portable terminal. For example, the controller 201 reads a metadata database of a server using access information, verifies a service description of the server, and verifies that the server includes a metadata database transmission function. Also, the portable terminal transmits a HTTP-GET request to a URL where the metadata database of the server is positioned and reads the metadata database.

The communication module 202 processes a signal transmitted and received through an antenna to perform voice and data communication. For example, the communication module 202 requests the server to transmit the metadata database and acquires the URL where the metadata database of the server is positioned.

The storage unit 203 may include a program storage unit for storing a program for controlling an operation of the portable terminal and a data storage unit for storing data generated while the program is executed. For example, the storage unit 203 receives and stores access information for accessing the metadata database of the server from the server and stores the metadata database of the server.

The input unit 204 provides input data generated by selection of a user to the controller 201.

Figure 3:
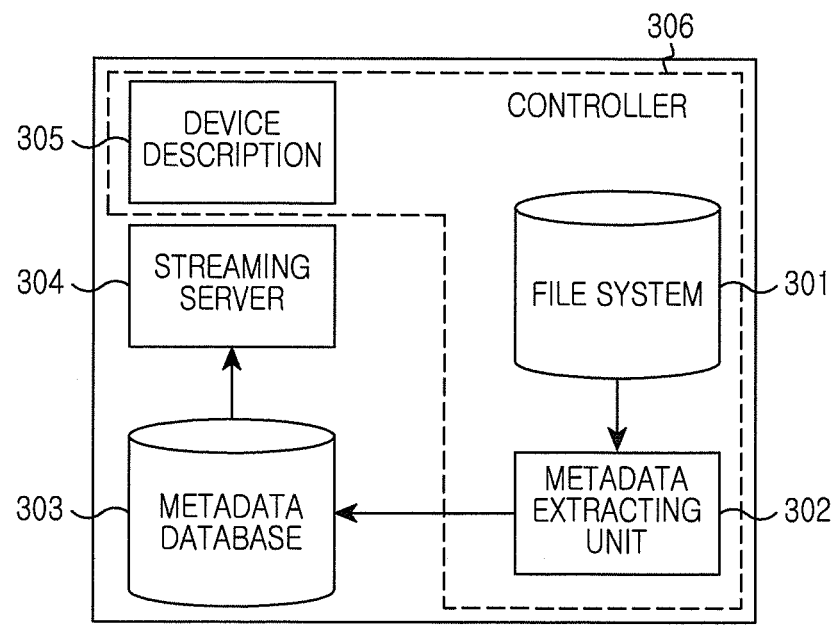
FIG. 3 is a block diagram illustrating a configuration of a server in a multimedia sharing apparatus using a copy of a metadata database of a portable terminal according to one embodiment of the present disclosure.

FIG. 3 is a block diagram illustrating a configuration of a server in a multimedia sharing apparatus using a copy of a metadata database of a portable terminal according to one embodiment of the present disclosure.

As shown in FIG. 3, the server in the multimedia sharing apparatus may include a file system 301, a metadata extracting unit 302, a metadata database 303, a streaming server 304, a device description 305, and a controller 306.

The file system 301 is a system for appending a name to a file and indicating whether a file is placed in any position to store or search the file. For example, as a list of a library's collections is written, a list of names and serial numbers of stored files in an Operating System (OS) is written. A system for maintaining and managing the above-described list is called the file system.

The metadata extracting unit 302 extracts metadata information of various contents stored in the file system 301. That is, the metadata extracting unit 302 extracts the metadata information in which a position and details of contents among the various contents stored in the file system 301, information about a writer, rights conditions, use conditions, use history, and the like, are recorded.

The metadata database 303 stores the metadata extracted from the metadata extracting unit 302. The metadata stored in the metadata database 303 is transmitted to the streaming server 304.

The streaming server 304 receives the metadata from the metadata database 303 and transmits the received metadata to the portable terminal. For example, the streaming server 304 provides access information for accessing the metadata database and transmitting the metadata database to the portable terminal. The streaming server 304 receives a request for transmitting the metadata database from the portable terminal. Also, the streaming server 304 receives an HTTP-GET request to the URL where the metadata database is positioned from the portable terminal and provides the metadata database.

The device description 305 publishes a metadata database transmission function in a service description.

The controller 306 may include the file system 301, the metadata extracting unit 302, and the device description 305.

Figure 4:
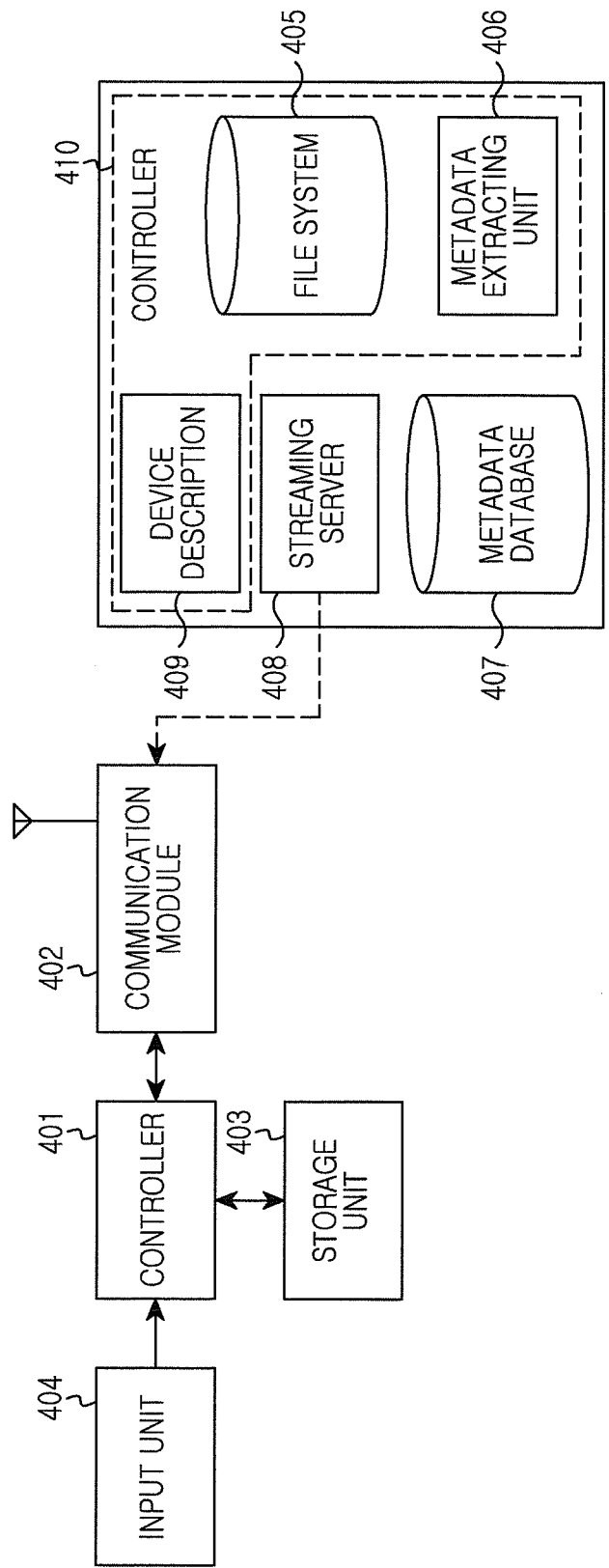
FIG. 4 is a block diagram illustrating a configuration of a multimedia sharing apparatus using a copy of a metadata database of a portable terminal according to one embodiment of the present disclosure.

FIG. 4 is a block diagram illustrating a configuration of a multimedia sharing apparatus using a copy of a metadata database of a portable terminal according to one embodiment of the present disclosure.

As shown in FIG. 4, the multimedia sharing apparatus may include a controller 401, a communication module 402, a storage unit 403, and an input unit 404 of the portable terminal. The multimedia sharing apparatus may also include a file system 405, a metadata extracting unit 406, a metadata database 407, a streaming server 408, a device description 409, and a controller 410 of a server. The controller 410 may include the file system 405, the metadata extracting unit 406, and the device description 409.

The device description 409 of the server publishes a metadata database function in a service description. The controller 401 of the portable terminal verifies the service description of the server and verifies that the server includes a metadata database transmission function. After the metadata database transmission function is verified, the communication module 402 of the portable terminal requests the server to transmit the metadata database 407. The above-described request is for acquiring a URL for accessing the metadata database of the server.

The metadata extracting unit 406 of the server extracts metadata information among various contents stored in the file system 405. The extracted metadata information is stored in the metadata database 407. The streaming server 408 of the server receives the request for transmitting the metadata database from the communication module 402 of the portable terminal.

The streaming server 408 transmits a URL where the metadata database 407 of the server is positioned and a size of the metadata database 407. If the URL where the metadata database 407 of the server is positioned and the size of the metadata database 407 are received, the controller 401 of the portable terminal transmits an HTTP-GET request to the URL where the metadata database 407 is positioned and reads the metadata database 407.

The controller 401 of the portable terminal stores the metadata database in the storage unit 403 of the portable terminal. The input unit 404 of the portable terminal receives a command for searching specific contents from a user. The controller 401 receives the command of the input unit 404 and may efficiently and quickly search corresponding contents using metadata information stored in the metadata database stored in the storage unit 403.

The controllers 201 and 401 of FIG. 2 and FIG. 4 may perform an overall operation of the portable terminal. The present disclosure separately describes the controller, the communication module, the storage unit, and the input unit to separately express respective functions thereof. However, when the portable terminal is actually implemented as a product, it may be configured such that all functions of the portable terminal may be processed in the controllers 201 and 401. Or, the portable terminal may be configured such that only some functions may be processed in the controllers 201 and 401.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A contents sharing method using a copy of metadata database of contents in a portable terminal, the contents sharing method comprising:
    determining whether a server provides a metadata database transmission function for transmitting a metadata database of contents stored in the server based on a service description of the server;
    requesting the metadata database of contents stored in the server to the server, if the mobile terminal is determined to be the server providing the metadata database transmission function;
    receiving access information for accessing the metadata database of contents from the server;
    acquiring the metadata database of contents from the server using the received access information;
    storing the acquired metadata database of contents; and
    searching, by the portable terminal, the contents of the server using the stored metadata database of contents,
    wherein the access information includes a uniform resource link (URL) where the metadata of contents is positioned in the server and a size of the metadata database of contents.

2. The contents sharing method of claim 1, wherein the service description comprises a Content Directory Service.

3. The contents sharing method of claim 1, wherein the acquiring the metadata database of contents from the server comprises:
    transmitting an HTTP-GET request to the URL where the metadata database of contents of the server is positioned; and
    receiving the metadata database of contents corresponding to transmit the HTTP-GET request.

4. A contents sharing method using a copy of a metadata database of contents in a server, the contents sharing method comprising:
    providing a service for publishing a metadata database transmission function in a service description, the service description being usable by a portable terminal to verify whether the server provides the metadata database transmission function for transmitting a metadata database of contents stored in the server;
    receiving a request for transmitting the metadata database of contents in the server from the portable terminal;
    transmitting access information for accessing the metadata database of contents stored in the server to the portable terminal, in response to receiving the request for transmitting the metadata database of contents from the portable terminal; and
    providing the metadata database of contents corresponding to the access information in the server to the portable terminal, when a request for transmitting the metadata database of contents is received based on the access information from the portable terminal,
    wherein the access information includes a uniform resource link (URL) where the metadata database of contents is positioned in the server and a size of the metadata database of contents.

5. The contents sharing method of claim 4, wherein the service is a Content Directory Service (CDS).

6. The contents sharing method of claim 4, wherein the providing the metadata database of contents of the server to the portable terminal at the server comprises:
    receiving an HTTP-GET request to the URL where the metadata database of contents is positioned from the portable terminal; and
    providing the metadata database of contents.

7. A portable terminal comprising:
    processing circuitry configured to transmit a request for a metadata database of contents to a server, and receive access information for accessing the metadata database of contents stored in the server and the metadata database of contents from the server;
    a memory configured to store the received access information and the received metadata database of contents; and
    a controller circuitry configured to:
        determine whether the server is provided a metadata database transmission function for transmitting the metadata database of contents stored in the server based on a service description of the server,
        request the metadata database of contents stored in the server to the server, if the controller circuitry is determined to be the server providing the metadata database transmission function,
        receive the access information for accessing the metadata database of contents from the server,
        acquire the metadata database of contents from the server using the received access information,
        store the acquired metadata database of contents, and search the contents of the server using the stored metadata database of contents,
wherein the access information includes a uniform resource link (URL) where the metadata database of contents is positioned in the server and a size of the metadata database of contents.

8. The portable terminal of claim 7, wherein the service description comprises a Content Directory Service.

9. The portable terminal of claim 7, wherein the controller circuitry is configured to transmit an HTTP-GET request to the URL where the metadata database of contents of the server is positioned and receive the metadata database of contents corresponding to transmit the HTTP-GET request.

10. A server comprising:
a controller circuitry including a device description configured to provide a service for publishing a metadata database transmission function in a service description, the service description being usable by a portable terminal to verify that whether the server provides the metadata database transmission function for transmitting a metadata database of contents stored in the server;
a metadata extracting unit configured to extract metadata information of various contents stored in the server;
a metadata database configured to store the metadata information extracted from the metadata extracting unit; and
a streaming server processor configured to:
receive a request for transmitting the metadata database of contents stored in the server from the portable terminal,
transmit access information for accessing the metadata database of contents stored in the metadata database to the portable terminal, in response to receiving the request for transmitting the metadata database of contents from the portable terminal, and
provide the metadata database of contents corresponding to the access information in the metadata database to the portable terminal, when a request for transmitting the metadata database of contents is received based on the access information from the portable terminal,
wherein the access information includes a uniform resource link (URL) where the metadata database of contents is positioned in the server and a size of the metadata database of contents.

11. The server of claim 10, wherein the service is a Content Directory Service (CDS).

12. The server of claim 10, wherein the streaming server processor is configured to receive an HTTP-GET request to the URL where the metadata database of contents is positioned from the portable terminal and provide the metadata database of contents corresponding to receive the HTTP-GET request.

13. The server of claim 10, wherein the metadata extracting unit is configured to extract the metadata information in which a position and details of contents among the various contents stored in the server, information about a writer, rights conditions, use conditions, and use history.

* * * * *